United States Patent [19]
Smith

[11] 4,306,655
[45] Dec. 22, 1981

[54] HOLDER OR CONTAINER FOR TAPE CARTRIDGES

[76] Inventor: Richard D. Smith, 28640 Vista Madera, San Pedro, Calif. 90732

[21] Appl. No.: 138,222

[22] Filed: Apr. 7, 1980

[51] Int. Cl.³ .................................................. B65D 85/30
[52] U.S. Cl. .................................... 206/387; 206/511; 220/23.4
[58] Field of Search ............... 206/387, 509, 511, 512, 206/387, 511; 220/20, 21, 22, 23.4, 23.83, 345, 1 A, 4 R, 4 A; 312/257 A, 257 R; 211/163

[56] References Cited

U.S. PATENT DOCUMENTS

| | | | |
|---|---|---|---|
| 2,970,715 | 2/1961 | Kappel et al. | 220/21 |
| 3,184,054 | 5/1965 | Kuhlman | 220/23.4 X |
| 3,219,400 | 11/1965 | Bergquist | 206/511 X |
| 3,361,293 | 1/1968 | Box | 206/511 |
| 3,851,936 | 12/1974 | Muller | 220/23.4 X |
| 3,889,817 | 6/1975 | Berkman | 206/387 X |
| 4,087,145 | 5/1978 | Weavers | 206/387 X |
| 4,111,502 | 9/1978 | Kessler | 206/387 X |
| 4,201,298 | 5/1980 | Larson et al. | 206/387 |
| 4,203,519 | 5/1980 | Fijitaki | 206/387 |

*Primary Examiner*—Steven M. Pollard
*Attorney, Agent, or Firm*—Herzig & Walsh, Inc.

[57] ABSTRACT

The article is a box or holder with partition members or shelves to hold items in the container between the said members. In a preferred form the box or holder may be square. Certain of the partition or shelf members are spaced so as to snugly hold a rectilinear item of a certain size transversely in the box. Spaced ribs are provided on the shelf members with a different spacing to hold additional items having a different width in a transverse position in the box. In this manner the box or holder has the capability of snugly and efficiently holding within it rectilinear articles of different widths and overall sizes, such as, for example, TV and computer game cartridges, or video tape cartridges, and the like. This capability is realized in a box of minimum size and with optimum efficiency.

5 Claims, 4 Drawing Figures

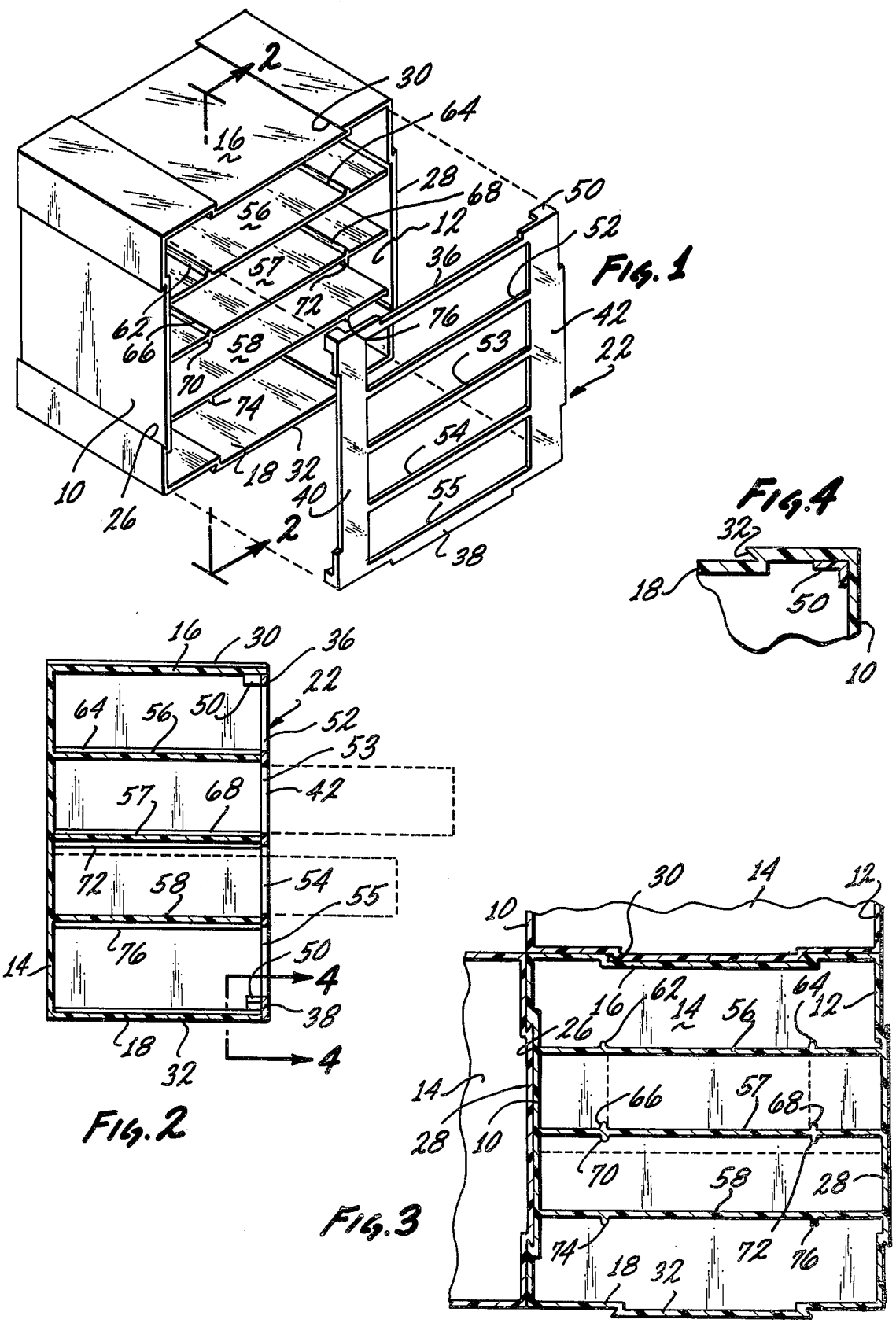

HOLDER OR CONTAINER FOR TAPE CARTRIDGES

BACKGROUND OF THE INVENTION

1. Field of the Invention

The field of the invention is that of containers, cabinets, or holders particularly adapted for holding, storage and/or carrying of articles, particularly rectilinear articles which may be items such as TV and computer game cartridges, and the like.

2. Description of the Prior Art

Known prior art patents having some relation to the field include U.S. Pat. Nos. 3,032,381; 3,561,004; 3,627,113; 3,666,337; 3,674,132; 3,710,900; and 3,830,363. The prior art patents deal primarily with cabinets or trays or similar structures which lack the capability or adaptability of being to hold in a single space, rectilinear articles of different sizes and thicknesses. The prior art is lacking in the unique qualities and capabilities of the invention as described in detail hereinafter.

SUMMARY OF THE INVENTION

The invention as referred to in the abstract is a holder or container which may simply be a box particularly adapted for holding small rectilinear articles and more particularly TV and computer game tape cartridges, or video tape cartridges. These articles, this is the cartridges, typically are rectilinear in configuration but come in different sizes and particularly in different thicknesses. It is desired to have available a container or holder for storage or carrying purposes in which various of these articles of different sizes can be held snugly and carried, stored, or transported. It is desired that these capabilities be embodied in a single container or holder and the herein invention realizes this purpose in a unique way.

The container or holder of the invention may preferably be square and of modular construction embodying a plurality of square units. Provided on the inner side walls of a unit are partition members or shelves. The partition members are spaced so that rectilinear articles, that is, cartridges can be snugly held between the members. Preferably the box has a face or front panel with rectangular openings to accommodate receiving cartridges that fit the openings, the cartridges then being held between the partitions or shelves.

In the light of the foregoing, the primary object of the invention is to provide and make available a container or holder having the capability of snugly holding within it rectilinear articles of a plurality of different sizes by way of partitions or shelves arranged so that articles can be positioned and held between the partitions or shelves within the container.

A further object is to provide a holder or container as in the foregoing object, wherein the partition members have spacings adapting the container to snugly hold various particular items and more especially TV and computer game tape cartridges, cassettes, and boxes for tape cassettes.

Further objects and additional advantages of the invention will become apparent from the following description and detailed drawings.

BRIEF DESCRIPTION OF THE DRAWINGS

FIG. 1 is an isometric view of a preferred form of the invention;

FIG. 2 is a sectional view taken along the line 2—2 of FIG. 1;

FIG. 3 is a sectional view of the box of FIG. 1, illustrating the modular construction.

FIG. 4 is a detail sectional view taken along line 4—4 of FIG. 2;

DESCRIPTION OF THE PREFERRED EMBODIMENT

FIGS. 1, 2, 3 and 4 show a preferred embodiment of the invention in which the holder or box is substantially square. Preferably it may be made of plastic by an injection molding process. In these figures the box has a sidewall 10 and opposite sidewall 12, a backwall 14, a top wall 16, and bottom wall 18. The box has one face over which there is placed a panel, as designated at 22, which will be identified herein as the front panel covering the face of the box.

In a preferred construction the design is modular whereby a plurality of boxes can be readily secured or joined together. To accommodate this, boxes are provided with tongues and grooves whereby various sides of a box can be readily joined to another box by way of a tongue and groove joint. As shown in FIG. 3 the side 10 is provided with a groove as designated at 26, the ends of which are under cut as shown. The opposite side 12 is provided with a tongue 28, the side edges of which are under cut as shown so that they can fit into a groove 26. Side 16 is provided with a groove 30 like the groove 26 and is provided with a tongue 32 like the tongue 28. FIG. 3 illustrates how the modular construction is used this figure showing additional boxes being secured to the one box by way of the tongue and groove joints formed between the tongues and the grooves on the sides of the boxes.

The front plate or panel 22 is generally flat and of a size to cover the front opening of the box. It is in the form of a frame having a top member 36, a bottom member 38, and side members 40 and 42. The top member 36 and the side member 40 have cutouts as shown so as to conform to the grooves 16 and 26 in the top 16 and the side 10 of the box. The side 42 and the bottom member 38 have extending parts as shown to accommodate their fitting over the tongues 28 and 32 on the side 12 and the bottom 18.

At each corner of the panel 22 on the inside there is provided an angular rib or lug designated at 50. These lugs fit inside the front corners of the box and then preferably can be secured by adhesive bonding or otherwise.

The front panel 32 has a plurality of similar rectangular openings in it as designated at 52, 53, 54 and 55. These openings are of a size to snugly receive a rectilinear object such as, for example, a TV computer game cartridge or a video tape cassette, which will fit through the opening. On the inside of the box are a plurality of partitions or shelves as designated at 55, 56, 57, which are equally spaced apart and are similarly spaced from the top and bottom walls. With the box in the position as shown in FIG. 1 these partitions form shelves as in a cabinet or the like. The openings 52-55 are in a position so that objects inserted through them come into position between the partitions and/or between a partition and top or bottom wall. Thus, as can be seen, due to the sizing of the openings at 52-55, the article to be stored is received through the opening and is then snugly held between the partitions or shelves which are aligned with the part of the front panel 22 and between the openings.

The box is constructed to accommodate objects as for example, tape cartridges of different widths. The width dimension is the dimension transversely of the box, as shown. The vertical dimension is identified as the thickness dimension. The third dimension is the length of the object or otherwise the depth of the box or cabinet.

Provided on the shelf 55 are spaced ribs 62 and 64 which are spaced to accommodate an object such as a tape cartridge of a different width which can be inserted through the opening 52. Similarly such object is held between the partition or shelf 55 and the top of the box. Shelf 55 has similar ribs 66 and 68 and additionally this particular shelf also has similarly spaced ribs on its lower side as designated at 70 and 72 to accommodate an object inserted into a position between the partitions or shelves 56 and 57. The partition 57 has ribs as shown at 74 and 76 on its under side having the same spacing as the other ribs on the shelves. The ribs 74 and 76 can accommodate an object such as a tape cartridge of a narrower width inserted through the opening 55 into a position between the shelf 57 and the bottom wall 18.

If desired the partitions or shelves 55-57 can be constructed for sliding movement so as to slide in and out with respect to the box. As may be seen the ribs on the shelves are positioned to accommodate and hold snugly an object in any one of the spaces either between shelves or between a shelf and the top and bottom wall. The shelf 56 has ribs on both sides since it is between two other shelves and therefore the ribs accommodate articles between shelf 56 and either the shelf 55 above and/or the shelf 57 below it.

From the foregoing those skilled in the art will understand the nature, construction and utilization of the invention and the manner in which it achieves and realizes the objects as set forth in the foregoing.

The foregoing disclosure is representative of a preferred form of the invention and is to be interpreted in an illustrative rather than a limiting sense, the invention to be accorded the full scope of the claims appended hereto.

I claim:

1. As a product of manufacture a holder or cabinet constructed for holding rectilinear flat sided articles of different sizes, especially tape cartridges comprising a rectilinear container having a front side having a plurality of uniform rectangular openings spaced from each other and being of a size to receive articles such as tape cartridges of a first size, means forming partitions within the container in a position normal to the said front side and in positions between the said front openings to form spaces opposite said openings of a size to receive articles of said first size, said partitions having means including relatively short ribs upstanding from the surface of the partitions on at least one side thereof, the said ribs being spaced apart an amount that is less than the corresponding dimension of the said rectangular openings in the front face of the container, the said spacing of the ribs being in an amount to snugly accommodate articles of a second size being placed into said container through said front openings, the said ribs being sufficiently short to allow insertion of articles of the first size into the said spaces.

2. A product as in claim 1 wherein at least one of said partition has ribs as identified on opposite sides of the partition whereby an article of the second size received in the holder through one of said front openings is held by ribs on at least one of said partitions on opposite sides of the article.

3. A product as in claim 1 wherein said front side is in the form of a panel having integral corner projections shaped to fit into the inside of the container for securement of the panel thereto.

4. A product as in claim 3 wherein each of said projections is right angular shaped having surfaces engagable with interior surfaces of the container.

5. A product as in claim 1 wherein the container has at least one tongue formed on a wall thereof and it has at least one groove formed on a wall thereof, the tongues and grooves being of such configuration that an individual container forms a module attachable to another container by way of a tongue and groove joint formed by a tongue on a wall of one container and a groove on a wall of another container.

* * * * *